(12) United States Patent
Karlström et al.

(10) Patent No.: US 8,696,873 B2
(45) Date of Patent: Apr. 15, 2014

(54) METHOD AND PLANT FOR PURIFICATION OF OIL-CONTAMINATED BILGE AND SLUDGE WATER ON A SHIP, AND SHIP EQUIPPED WITH SUCH PLANT

(75) Inventors: Benny Karlström, Torsholma (FI); Jan Hedkvist, Bromma (SE)

(73) Assignee: PPM-Clean AB, Lappo (FI)

( * ) Notice: Subject to any disclaimer, the term of this patent is extended or adjusted under 35 U.S.C. 154(b) by 0 days.

(21) Appl. No.: 13/358,278

(22) Filed: Jan. 25, 2012

(65) Prior Publication Data

US 2012/0160660 A1 Jun. 28, 2012

Related U.S. Application Data

(63) Continuation of application No. PCT/SE2009/050913, filed on Jul. 27, 2009.

(51) Int. Cl.
| | | |
|---|---|---|
| *B01D 3/10* | (2006.01) | |
| *B01D 3/42* | (2006.01) | |
| *B01D 1/16* | (2006.01) | |
| *C02F 1/04* | (2006.01) | |
| *C02F 1/16* | (2006.01) | |
| *C02F 101/32* | (2006.01) | |
| *B63J 4/00* | (2006.01) | |

(52) U.S. Cl.
USPC ............... 203/11; 159/44; 159/46; 159/48.1; 159/901; 159/DIG. 16; 202/83; 202/176; 202/197; 202/200; 202/202; 202/205; 202/236; 203/10; 203/22; 203/90; 203/91; 203/98; 203/100; 210/85; 210/170.05; 210/740; 210/774; 210/805

(58) Field of Classification Search
USPC ................ 159/3, 44, 46, 48.1, 901, DIG. 16; 196/46.1, 99, 114, 123, 132, 138; 202/83, 176, 197, 200, 202, 205, 236, 202/258; 203/10, 11, 22, 90, 91, 98, 100, 203/DIG. 8; 210/85, 170.05, 170.11, 740, 210/774, 805
See application file for complete search history.

(56) References Cited

U.S. PATENT DOCUMENTS 2,280,093 A * 4/1942 Kleinschmidt ................ 203/26
3,329,583 A * 7/1967 Othmer ........................ 203/10
(Continued)

FOREIGN PATENT DOCUMENTS

| DE | 28 33 106 A1 | 6/1980 |
| DE | 29 43 261 A1 | 4/1981 |

(Continued)

OTHER PUBLICATIONS

Communication (First Office Action) dated Jul. 9, 2013 issued in related Japanese Patent Application No. 2012-522778 and English language translation thereof (9 pages).

(Continued)

*Primary Examiner* — Virginia Manoharan
(74) *Attorney, Agent, or Firm* — Lucas & Mercanti LLP; Robert P. Michal

(57) ABSTRACT

The present invention relates to a method for purification of bilge and sludge water on a ship, especially at sea, using excess heat from the ship's engine(s) to a level of oil contamination of less than 15 ppm. The invention also relates to a plant for carrying out the method, and a vessel including such plant, as well as the use of the method and plant.

17 Claims, 1 Drawing Sheet

(56) References Cited

U.S. PATENT DOCUMENTS

| | | | |
|---|---|---|---|
| 4,066,545 A | 1/1978 | Walters et al. | |
| 4,640,769 A * | 2/1987 | Wemhoff | 210/96.1 |
| 4,649,281 A * | 3/1987 | Schmitt et al. | 250/574 |
| 4,940,134 A * | 7/1990 | Aoki et al. | 202/202 |
| 7,163,107 B1 | 1/2007 | Verosto et al. | |
| 7,614,367 B1 * | 11/2009 | Frick | 122/26 |
| 8,371,251 B2 * | 2/2013 | Frick | 122/406.1 |
| 2002/0153324 A1 * | 10/2002 | Lynch | 210/688 |
| 2004/0007500 A1 | 1/2004 | Kresnyak | |
| 2007/0017876 A1 * | 1/2007 | Albinson et al. | 210/748 |

FOREIGN PATENT DOCUMENTS

| | | |
|---|---|---|
| DE | 32 06 253 A1 | 9/1983 |
| DE | 33 44 526 A1 | 6/1985 |
| DE | 34 32 210 A1 | 3/1986 |
| DE | 37 03 525 A1 | 8/1988 |
| FR | 1 290 820 A | 4/1962 |
| GB | 2 197 660 A | 5/1988 |
| JP | 11-208593 | 8/1999 |
| JP | 2003-126851 | 5/2003 |
| JP | 2003-517559 | 5/2003 |
| JP | 2003-245656 | 9/2003 |
| SE | 526 811 C2 | 11/2005 |
| SE | 527 049 C2 | 12/2005 |
| WO | WO 81/01141 A1 | 4/1981 |
| WO | WO 01/44727 A1 | 6/2001 |
| WO | WO 2005/090151 A1 | 9/2005 |
| WO | WO 2006/092639 A1 | 9/2006 |
| WO | WO 2006/122560 A2 | 11/2006 |

OTHER PUBLICATIONS

International Search Report mailed May 31, 2010 issued in a related PCT International Application No. PCT/SE2009/050913 (3 pages).

PCT International Preliminary Report on Patentability mailed Sep. 15, 2011 issued in a related PCT International Application No. PCT/SE2009/050913 (8 pages).

* cited by examiner

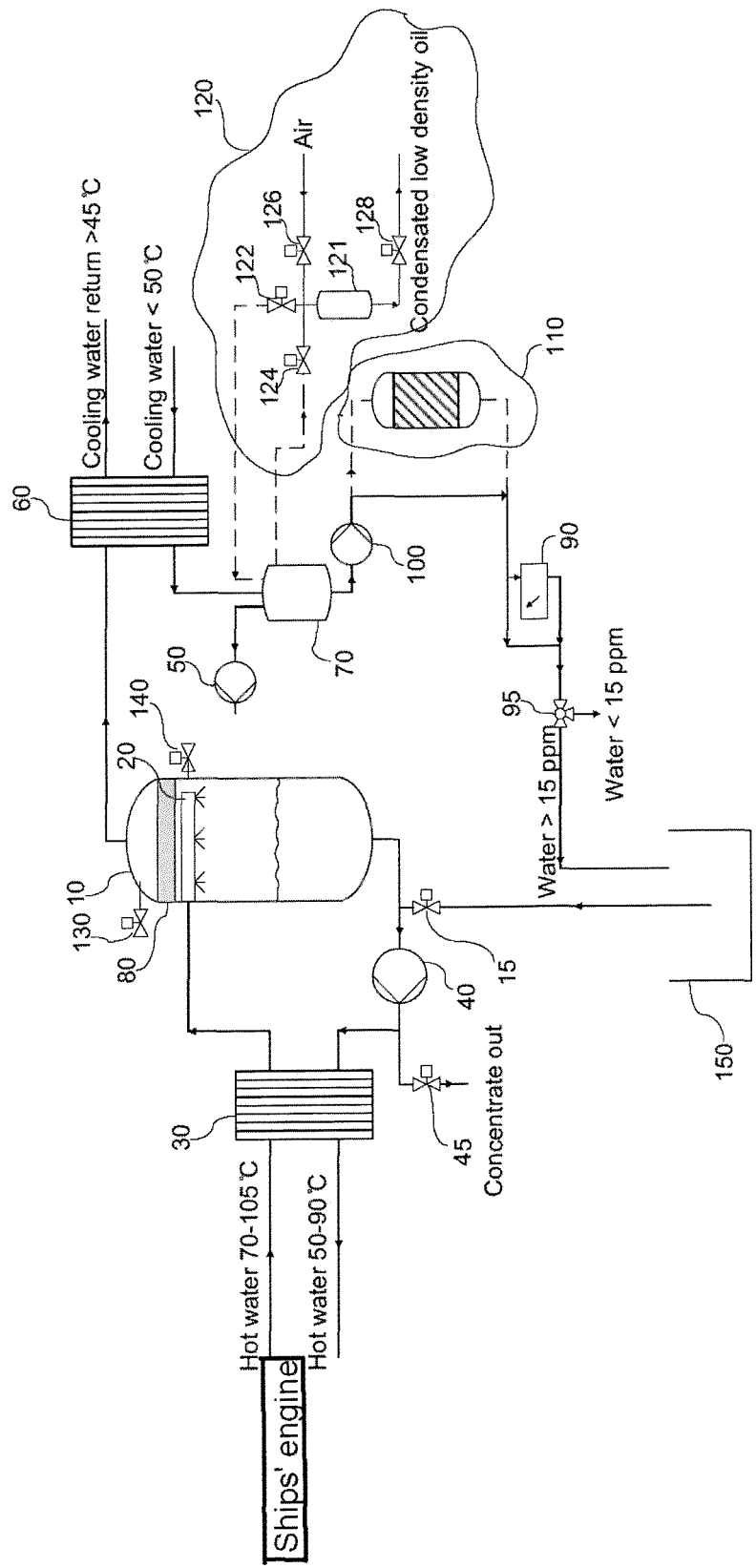

METHOD AND PLANT FOR PURIFICATION OF OIL-CONTAMINATED BILGE AND SLUDGE WATER ON A SHIP, AND SHIP EQUIPPED WITH SUCH PLANT

CROSS-REFERENCE TO RELATED APPLICATION

This is a Continuation of PCT International Application PCT/SE2009/05091.3 filed Jul. 27, 2009, the entire disclosure of which is incorporated herein by reference.

TECHNICAL FIELD OF THE INVENTION

The present invention relates to a method of purification of bilge and sludge water on a ship, especially at sea, using excess heat from the ship's engine(s) to a level of oil contamination of less than 15 ppm. The invention also relates to a is plant for carrying out the method, and a vessel including such plant, as well as the use of the plant and method.

RELATED ART

On a ship large amounts of oil-contaminated water are obtained. The water may e.g. be due to wetting of the ship's interior from condensation of water vapour, rain or waves that surge across the vessel. Such water may be designated clean bilge water. However, machinery and other oil-consuming units on the ship often tend leak to some extent. The water on the ship will therefore be contaminated with oil to some extent. Such water is usually referred to as bilge water. Water-contaminated oil is also obtained, such as from heavy fuel oil purifiers, and from lubricating oil purifiers. Conventionally, the resulting oil-contaminated water and water-contaminated oil are collected in a common container which is referred to as sludge water tank. In the sludge water tank some separation of oil and water will occur due to gravity. Water from which oil has been separated is drawn to another container, which is referred to as bilge water tank. The bilge water is still heavily contaminated with oil, such as for example by a content of 5% oil.

Conventional purification of oil-contaminated water on ships is a very time-consuming process, requiring large settling tanks and pumping of large volumes of liquid from one tank to another according to complex schemes. Draining of water from the sludge water tank to the bilge water tank is usually handled by ship engineer personnel.

According to current environmental legislation, such as laid down in the MARPOL Convention, water contaminated with more than 15 ppm of oil may not be discharged into the sea. This requirement currently applies to any ship of 400 tons gross tonnage and above other than an oil tanker.

In the prior art there have been numerous attempts to simplify the process of purification of the oil-contaminated water and to separate oil from water and vice versa.

For example, DE 3206253 A1 discloses separation of oil from bilge water under reduced pressure using excess heat from the ship's engines.

Attempts have been made to purify bilge water by chemical means, such as by flocculation, such as used by Marinfloc AB, Sweden. Purification by flocculation however requires that cleaning agents forming emulsions of oil and water be avoided on the ship, since otherwise oil-and-water emulsions ending up in the bilge water to be purified will interfere with the flocculation process.

The processes used on ships today are generally based on precipitation of oil components by the addition of chemical to the oil-contaminated bilge water, WO 2005/090151 A1 discloses a method for purification of bilge water by means of evaporating the water in a boiler and a plant therefor. In the method disclosed therein an initial separation step is conducted first, in which a main part of the separation between oil and water is done. Water purified, in the initial purification step is supplied to a boiler. Heating is accomplished within the boiler by means of a heating coil. It is preferred to use heat from the propulsion of the ship for heating the boiler, such as steam surplus from the flue gas boiler. According to the method the evaporation normally takes place at atmospheric pressure. However, boiling/evaporation, may also take place at pressures below or above atmospheric pressure. Consequently, in one embodiment evaporation takes place in the boiler at a pressure below atmospheric pressure. The maximum allowable upper limit of 15 ppm of oil-contamination in water to be discharged into the Baltic Sea is mentioned. The degree of purification achievable by means of the method is however not specified, it is merely mentioned that "by allowing the water to condense, after evaporation of the bilge water, the advantage is achieved among other things that it is easy to by an oil gauge to control that the water thereafter heaved overboard is within allowed limits".

DE 3432210 A1 and DE 3344526 A1 both disclose a method of reducing the water content in oil sludge in order to increase the heat content thereof, thereby enabling combustion of the oil sludge in an incinerator without having to add additional fuel for the incineration of the sludge. Water is separated from the oil sludge while heating the sludge under reduced pressure.

WO 2006/122560 A1 describes a method for purification of oil sludge containing water and a plant therefor. The goal of the method is to minimize the amount of oil on a ship not used to the advantage in the engines of the ship. According to the method oil sludge is consequently purified to a level so that the oil cannot merely be incinerated on the ship, but instead injected into the engine of the ship. In the process oil sludge is heated in a heat exchanger and then fed into an evaporation chamber. In some situations it may be expedient to inject the oil sludge by means of nozzles to disperse it. The plant disclosed includes means for changing the atmospheric pressure to the effect that water can be separated off the oil sludge at different temperatures. A sub-atmospheric pressure preferably prevails in the evaporation chamber whereby water is distilled off the oil when the oil is injected into the chamber. The process is preferably operated in batches. The upper allowed limit of 15 ppm of oil in water to be discharged into the sea is initially mentioned, as well as the fact that clean bilge water often contains oil to such an extent that it may not be to discharged into the sea for this reason. The water vapour drawn out the evaporation container is conveyed to a clean bilge tank.

It is therefore an object of the invention to provide a method which is apt to be operated also at heavy sea, and, at the same time allows for reducing the amount of bilge and sludge water on a ship at sea. Preferably the method should also be economic, efficient and environmentally advantageous.

For a method, such as disclosed in WO 2005/090151 A1, wherein excess heat from the ship's engine is used for heating in the purification of bilge water by means of evaporation under sub-atmospheric pressure, comprising the steps of: (a) heating of oil-contaminated water; (b) evaporating the water at a sub-atmospheric pressure; (c) condensing the water; (d) measuring the level of oil-contamination in the water obtained in step (c) as compared to a certain tolerable maximum upper limit; (e) withdrawing oil sludge obtained in step (b) from the process; (f) optionally discharging at sea water not exceeding the upper limit as measured in step (d), the above object has been solved by the following features, according to which any water exceeding the upper limit in step (d) is recirculated back to step (a); steps (a) and (b) are carried out at different locations in the process; in step (b) oil-contaminated water entering step (b) is finely divided into droplets; and, any particles and/or aerosols obtained in step (b) are separated from the water vapour obtained in step (b).

It is also an object to provide a plant suitable for carrying out the method.

For a plant, such as disclosed in FIG. 1 of WO 2006/122560 A1, which is considered to be more closely related to the invention than that of WO 2005/090151 A1, comprising an evaporation chamber for evaporation of water, one or more nozzles in the evaporation chamber for injection of oil-contaminated water, a heat exchanger for heating oil-contaminated water which is external to the evaporation chamber, a circulation pump for recirculating liquid from the bottom of the evaporation chamber back to said heat exchanger for heating oil-contaminated water, and vacuum means for producing a sub-atmospheric pressure in the evaporation chamber, the above object has been solved by means of provision of a condenser for condensing the water vapour led out from the evaporation chamber, a condensation tank, a demister which is located in the evaporation chamber above said one or more nozzles, an oil gauge for measuring the level of oil-contamination in the water obtained from the condenser, and means for re-circulating water which has a higher concentration of oil than the maximum limit back to the evaporation chamber.

SUMMARY OF THE INVENTION

The present inventors have found that all prior art methods for purification of oil-contaminated water on a ship require one or more settling steps for separating oil and water. For example, although WO 2005/090151 A1 teaches that if the bilge water to be purified already has a relatively low oil content, the initial separation step can be omitted, the bilge water itself is the result of a separation step as described above. The settling steps use settling tanks. In order for proper settling to occur, the contents of the settling tank must be left undisturbed. Accordingly, the process of separation by settling is very sensitive to motion of the settling tank. When the ship is in motion and/or subjected to more or less heavy sea, settling will not be efficient.

The inventive method does not require any initial settling, sedimentation or separation step at all, and can consequently be operated at sea during when the ship is in motion. Sludge water can be fed directly into the process from the sludge water tank, i.e. without any preceding purification.

As a consequence, on existing ships provided with both sludge water and bilge water tanks, the bilge water tank can be omitted, or preferably be used as a clean water tank for containing water purified by means of the method having a maximum oil content of 15 ppm. That is to say, the plant of the invention can conveniently be installed and used on existing ships using existing sludge water and bilge water tanks, without the requirement for any additional storage or settling tanks.

Accordingly, on ships presently using any additional settling or storage tanks, installation the plant will allow for removal of such tanks in favour of improved tonnage.

The plant can also conveniently be installed in newly built ships.

The inventive process does not use or require any added chemical agents.

The method can be readily automated, and can also be operated continuously.

The invention allows for reduction of oil-contamination in bilge and/or sludge water to a level below 15 ppm, and more typically below 5 ppm. The reduced, minute amounts of oil thus reaching the sea are believed to be readily degradable by natural processes in the sea.

The invention also allows for substantially reducing any contents in the oil-contaminated water of metals, and particularly heavy metals. This is believed to be a major environmental advantage. Environmental regulations in this regard are also likely to be adopted in the future.

The method and plant of the invention also substantially reduce operational costs for purification of oil contaminated water on a ship, as compared to prior art methods, such as flocculation, chemical precipitation, centrifugal separation, and gravitational separation.

Also, markedly reduced volumes of contaminated water need to be transported ashore to be taken care of on land. Thus, it is a major advantage that purification can be performed already at sea, especially using excess heat.

In a first aspect the invention relates to a method for purification of sludge and/or bilge water on a ship using excess heat from the ship's engine(s) to provide the necessary heating, comprising the steps of (a) heating of oil-contaminated water; (b) evaporating the water at a sub-atmospheric pressure; (c) condensing the water; (d) measuring the level of oil-contamination in the water obtained in step (c) as compared to a certain tolerable maximum upper limit; (e) withdrawing oil sludge obtained in step (b) from the process; (f) optionally discharging at sea water not exceeding the upper limit as measured in step (d), wherein any water exceeding the upper limit in step (d) is re-circulated back to step (a), wherein steps (a) and (b) occur at different locations, wherein in step (b) oil-contaminated water entering step (b) is finely divided into droplets, and wherein any particles and/or aerosols obtained in step (b) are separated from the water vapour obtained in step (b).

In another preferred embodiment withdrawal of the liquid phase from the bottom of the evaporation chamber is rapid so as to minimize the extent of any deposition on the internal surfaces of the evaporation chamber.

In yet a preferred embodiment, the velocity of the liquid flow through the heat exchanger is sufficiently high to achieve a turbulent flow over the heat exchanging surfaces of the heat exchanger, thereby minimizing the extent of any deposition on the heat exchanging surfaces.

In a further preferred embodiment, the heating medium supplied to the heat exchanger is cooling water from the ship's engine(s), such as from the ship's High Temperature (HT) system.

In another aspect the invention relates to a plant for carrying out the inventive method comprising an evaporation chamber for evaporation of water, one or more nozzles in the evaporation chamber for injection of oil-contaminated water, a heat exchanger for heating oil-contaminated water which is external to the evaporation chamber, a circulation pump for re-circulating liquid from the bottom of the evaporation chamber back to said heat exchanger for heating oil-contaminated water, vacuum means for producing a sub-atmospheric pressure in the evaporation chamber, which plant further comprises a condenser for condensing the water vapour exiting the evaporation chamber, a condensate tank for holding condensed water obtained in the condenser, a demister which is located in the evaporation chamber above said one or more nozzles, and an oil gauge for measuring the level of oil-contamination in the water obtained from the condenser.

In a preferred embodiment of the plant the bottom of the evaporation chamber is essentially conical. A conical shape of the bottom will minimize any undesired formation of deposits on the interior of the walls of the bottom.

In another preferred embodiment of the plant a restrictor valve for restricting the flow of heated oil-contaminated water exiting the heat exchanger which is being fed to the one or more nozzles is provided on the conduit leading from the heat exchanger to the evaporation chamber. By means of adjusting the valve, and thereby the flow passing same, formation of gas bubbles in the heat exchanger can be avoided. Gas bubbles could otherwise lead to formation of deposits of on the heat exchanging surfaces in the heat exchanger.

Further advantages and preferred embodiments will become apparent from the detailed description and appended claims.

BRIEF DESCRIPTION OF THE DRAWINGS

FIG. 1 illustrates an embodiment of the plant of the invention wherein the ship's HT system is used for heating and the ship's Low Temperature (LT) system is used for cooling the condenser. The FIGURE is not drawn to scale.

DETAILED DESCRIPTION

With reference to FIG. 1, the principal different parts of the plant of the invention in its most generic embodiment are the following: an evaporation chamber 10 for evaporating water; two heat exchangers 30 and 60, respectively, one (30) for heating oil contaminated water, and one (60) for condensing water vapour leaving the evaporation chamber (heat exchanger 60 will also be referred to as a condenser in the following); a condensate tank 70 for holding condensed water obtained in the condenser; a circulation pump 40 for circulating oil-contaminated water through the heating heat exchanger 30; vacuum means 50 for creating a sub-atmospheric pressure in the evaporation chamber 10; and an oil gauge 90 for monitoring the concentration of oil in the condensate water obtained from the condenser 60, and means for re-circulating water having a too high level of oil back to the heating heat exchanger and evaporation chamber for further purification, such as through a three-way valve 95, and via the bilge and/or sludge tank 150.

Evaporation in the evaporation chamber 10 is performed at sub-atmospheric pressure using a flash system, i.e. one or more nozzles 20 in the evaporation chamber for increasing the surface to volume ratio of the water being injected into the evaporation chamber, and thereby enhancing the evaporation process.

A demister 80 is located in the evaporation chamber 10 above said one or more nozzles 20 in order to separate particles and/or aerosols from the water vapour leaving the evaporation chamber over the top. Particles may result from solid or liquid contaminants in the water to be purified, and aerosols may be formed in the chamber during injection through the nozzles and/or evaporation, e.g. from lighter hydrocarbon fractions present in the water being injected into the chamber.

The condenser 60 comprises a heat exchanger for cooling the water vapour, so as to condense same. The condensate tank 70 could be combined with the condenser. Accordingly, in one embodiment the condenser may be adapted so as to be able to hold a volume of condensate at the bottom thereof. Preferably, the condenser 60 and condensate tank 70 are separate as shown in FIG. 1. In a preferred embodiment the separate condensate tank 70 is designed so as to allow for gravitational separation of any light oil fraction contained in the condensate water. This can be achieved by means of a condensate 70 tank having a sufficiently high ratio of height to width, so that an oil layer may form on top of the water layer contained therein. By means of such sufficiently high ratio of height to width the light oil separation process will not be particularly sensitive to movements and heavy sea. The upper oil layer may then be drawn off from the water layer and separated from the process. With reference to FIG. 1, this may be accomplished by drawing off the oil layer from condensate tank 70 via the conduit marked with the lower broken line via valve 124 into the further separation means 120 for separating out condensated low density oil. As shown in FIG. 1, separation means 120 may e.g. comprise four valves, 122, 124, 126, and 128, respectively, and a low density oil tank 121. The tank 121 is connected via valve 122 to sub-atmospheric pressure in condensate tank 70, and to the atmosphere (as denoted by "Air") via valve 126. Condensated low density oil could then be discharged via valve 128.

In a preferred embodiment, an activated carbon filter 110 is included in the plant as depicted in FIG. 1, for further enhanced purification. The water leaving the condensate tank 70 is then led through filter 110 before entering the oil gauge or ppm control 90.

The evaporation is carried out under sub-atmospheric pressure, typically at an absolute pressure of 50-700 mbar, preferably of about 0.7-0.9 bar below atmospheric pressure, corresponding to about 100-300 mbar absolute pressure. The evaporation process may typically be carried out at a temperature of 25-90° C., preferably 40-70° C., and more preferably at 50-65° C. Preferably, the temperature in the evaporation chamber follows the vapour pressure curve of the liquid to be injected into the evaporation chamber. As an example, a boiling temperature of 60° C. will correspond to an absolute pressure of about 200 mbar (or −0.8 bar gauge pressure).

The heating medium entering the heating heat exchanger 30 is not critical and could be any medium apt to transfer excess heat from the ship's engine(s) to the evaporation process, such as e.g. oil, steam or water. Preferably, an existent cooling system on the ship is used, to which system heat exchanger 30 may be connected. It is presently preferred to use cooling water from the ship's engine(s). The water entering the heat exchanger 30 may e.g. be of a temperature of about 70-105° C., while water exiting the heat exchanger 30 may be of a temperature of 50-90° C. Preferably, heat exchanger 30 is connected to the ship's High Temperature (HT) system.

Also, the cooling medium used in the heat exchanger 60 for condensing the water vapour is not critical. Consequently any suitable coolant could be used, such as e.g. sea water. Preferably, an existing cooling or low temperature system on the ship is used, to which the heat exchanger 60 may be connected. It is presently preferred to use water. The water entering the heat exchanger 60 may e.g. be of a temperature of less than about 50° C., while water exiting the heat exchanger 60 may be of a temperature of above about 45° C. In a preferred embodiment, heat exchanger 60 is connected to the ship's Low Temperature (LT) system.

The present inventors have found that aerosols tend to form in the evaporation chamber 10 during injection of the oil-containing water trough nozzles 20. In order to prevent such aerosols a demister must be provided in the evaporation chamber.

The inventors have found a suitable gas flow velocity in the evaporation chamber to be up to about 3 m/s. At velocities above about 4 m/s, entrainment of particles via the demister 80 to the condensate tend to increase unduly, and thereby also the content of impurities in the condensate. A suitable gas flow velocity through the demister has been fount to be up to about 4 m/s. For same reasons as above, the gas flow velocity through the demister should preferably not exceed about 6 m/s. Velocities of up to 10 m/s velocity through the demister could however be tolerated, as the plant still would be able to produce sufficiently purified water, but are less preferred.

In a preferred embodiment of the process, during operation, the flow through the evaporation chamber 10, i.e. the injected flow and the flow being withdrawn from the bottom of the chamber, is regulated so as to allow for a certain extent of separation of oil and water to occur in liquid phase at the bottom of the chamber, so that there will be a higher concentration of oil in the surface layer of the liquid phase contained therein. Thereby, the fluid being re-circulated from the bottom of the chamber 10 to heat exchanger 30 will exhibit a higher water content, and the purification process will thereby be more efficient.

The inventive process may be operated on demand, that is to say the process may be operated whenever there is a sufficient amount of oil-contaminated water to be purified, such as governed by a level controller (not shown) in the sludge water tank 150.

The oil sludge which is obtained from the process may for example contain 20-30% water, and can e.g. be incinerated on the ship, or be further purified, such as described in WO 2006/122560 A1, to be injected into the ship's engine(s) as fuel.

The operation of the inventive process and plant will now be described in further detail.

As an example, the process could be started and operated as follows. Vacuum pump 50 evacuates the evaporation chamber, e.g. down to about 100 mbar (0.9 bar below atmospheric pressure). When a certain pressure in the system, such as 500 mbar, has been reached, valve 15 opens and oil-contaminated water is let into the system from the bilge or sludge tank 150 until a certain predetermined operating level of liquid has been reached in evaporation chamber 10. At this stage circulation pump 40 is started. The operation is now in progress. The vacuum pump 50 will keep the system evacuated down to e.g. 100-250 mbar pressure depending on the temperature of the liquid in the evaporation chamber. Heat energy will be transferred to the oil-contaminated water as it passes the heating heat exchanger 30 through which a heating medium is being circulated. The oil-contaminated water will flow through a flash system comprising nozzles 20 and then enter the evaporator chamber 10 wherein the injected liquid is subjected to sub-atmospheric pressure. When the pressure drops after the flash system, evaporation of water will occur. The water vapour flows through a demister 80 and then enters the condenser 60. The condensed water is pumped via pump 100 out from the bottom of the condenser, optionally through an activated carbon filter 110. The ppm control unit 90 establishes the purity of the water; If the content of oil in the purified water is below 15 ppm a three-way valve 95 opens to a clean water tank (not shown). If the content of oil in the purified water is above 15 ppm the three way valve instead opens to the bilge or sludge water tank 150. As the evaporation of water proceeds, the concentration of oil and other non-evaporable components in liquid leaving from the bottom of the evaporation chamber 10 to heat exchanger 30 via circulation pump 40 increases. When the concentration increases, the boiling point will change. This will give information of the extent of concentration of oil in the liquid. When a set point of temperature increase, of e.g. 2 to 5° C. above the boiling point of water at the relevant pressure, is reached, the evaporating cycle is discontinued, and the system is emptied from the resulting concentrate (sludge) via valve 45. Once the concentrate has been discharged, a new cycle may begin. Accordingly, in batch-wise operation, each batch may be run until a desired level of concentration has been reached in the resulting sludge, thereafter the sludge is discharged from the plant, and a new batch may be commenced.

In continuous operation, the concentration of oil in the liquid phase in the bottom of evaporation chamber 10 is kept close to a certain pre-set maximum level. Concentrate is discharged from the system via valve 45 and pump 40, and the system is replenished with oil-contaminated water from the sludge and/or bilge tank 150 via valve 15. In this mode, the system does consequently not have to be emptied from the resulting concentrate (sludge). Again, the extent of concentration may be controlled by measuring the increase of the boiling point of the liquid in the evaporation system. A higher value corresponds to a higher concentration and a lower amount of concentrate.

The vacuum of the evaporation chamber may be used for drawing the oil-contaminated water into the system. The evaporation chamber is preferably provided with level sensors (not shown) for controlling and maintaining proper flow and level of liquid in the evaporation chamber. Thereby, operation without continuous monitoring of the plant is enabled.

In a preferred embodiment the evaporation chamber 10 is provided with means for eliminating splashing or swashing of the liquid phase in said chamber (not shown). Such means can e.g. comprise a flange running alongside the inner circumference of the chamber.

The evaporation chamber 10 is preferably provided with a valve 140 for enabling addition of a defoaming agent via said valve 140. A defoaming agent may be conveniently be used if excessive foaming occurs in evaporation chamber 10.

The evaporation chamber 10 is preferably provided with a valve 130 for venting the chamber to the atmosphere.

The evaporation system temperature may e.g. be controlled by means of controlling the flow of heating medium entering heat exchanger 30. In one embodiment a by-pass valve and conduit may be provided (not shown), enabling directing the liquid flow exiting from pump 40 directly to the evaporation chamber 10, thereby by-passing the heat exchanger 30. Thereby, cooling of the evaporation system will be provided for.

The vacuum means is not critical and can be any conventional means for providing a reduced pressure. For example, a conventional vacuum pump could be used, such as an ejector pump or a liquid ring pump. The vacuum could also be provided using excess heat from the ship's engine.

The capacity of the plant is preferably about 100 liters of condensate per hour to about 2000 liters of condensate per hour. As an example, a plant designed for a capacity of 100-120 l/h may suitably use an evaporation chamber 10 of a diameter of about 500 mm.

EXAMPLE

The inventive plant as shown in FIG. 1, including an activated carbon filter, was tested as will be described in the following. The diameter of the evaporation chamber 10 of the plant was 500 mm. The evaporation was carried out at a temperature of about 52° C. and at a capacity of 100 l/h. With the specific embodiment of the inventive plant tested, the best purification results are obtained at an evaporation temperature of about 50-65° C. and at a condensate rate of up to 120 l/h.

The testing procedure was verified and accepted by Det Norske Veritas (DNV).

Accordingly, the plant was run with oil-contaminated water (15 liters of heavy fuel oil in 80 liters of water). The resulting purified water exhibited a concentration of below 5 ppm of oil without use of activated carbon filter. Thereafter, about 15 liters of gas oil were added to the remaining water. The resulting purified water was found to exhibit similar levels of oil concentration. 80 liters of bilge/sludge water were then added to the system. The plant was run for 4 hours and samples were taken continuously upstream and downstream of the activated carbon filter. 2 random samples were selected, one from upstream of the carbon filter, and one from downstream of the carbon filter. The samples were then sent for analysis to ALS Scandinavia AB. The analysis demonstrated 3.5 ppm and 0.9 ppm of oil, respectively for the samples. This is clearly well below 15 ppm, and even below 5 ppm of oil.

In the below table the contents of various metals contained in the resulting purified water when running the plant on Test Fluid C (TF-C) are listed. The testing was performed as specified by THE MARINE ENVIRONMENT PROTECTION COMMITTEE, (MEPC) RECALLING Article 38(a) of the Convention on the International Maritime Organization (IMO), in the document: RESOLUTION MEPC.107(49), MEPC 49/22/Add.2 Adopted on 18 Jul. 2003.

| ELEMENT | Unit of Conc. | Concentration |
| --- | --- | --- |
| Ca | mg/l | <0.2 |
| Fe | mg/l | <0.004 |
| K | mg/l | <0.5 |
| Mg | mg/l | <0.09 |
| Na | mg/l | <0.1 |
| S | mg/l | <0.2 |
| Al | µg/l | <2 |
| As | µg/l | <1 |
| Ba | µg/l | <0.2 |
| Cd | µg/l | <0.05 |
| Co | µg/l | <0.05 |
| Cr | µg/l | <0.5 |
| Cu | µg/l | <1 |
| Hg | µg/l | <0.02 |
| Mn | µg/l | <0.2 |
| Ni | µg/l | <0.5 |
| Pb | µg/l | <0.2 |
| Chloride | mg/l | 1.2 |

As can clearly be seen the contents of heavy metals in the purified water are extremely low.

The invention claimed is:

1. A method for purification of oil-contaminated water generated on a ship, comprising:
    gathering the oil-contaminated water in a bilge/sludge tank;
    directing the oil-contaminated water from the tank to a heating system;
    heating the oil-contaminated water in the heating system;
    evaporating the heated oil-contaminated water at a sub-atmospheric pressure via an evaporation chamber that is situated at a different location than the system to obtain water vapor, oil sludge and particles and/or aerosols, the step of evaporating the heated oil-contaminated water comprising finely dividing the heated oil-contaminated water into droplets to be introduced into the evaporation chamber; then
    separating the particles and/or aerosols from the water vapor in the evaporation chamber; then
    condensing the water vapor after the particles and/or aerosols have been separated therefrom to obtain water condensate; then
    measuring the level of oil-contamination in the water condensate as compared to a maximum upper limit which is 15 ppm;
    re-circulating water condensate having a measured level of oil-contamination exceeding the maximum upper limit to the heating system to be heated; and
    withdrawing the oil sludge obtained in the evaporation chamber,
    wherein the oil-contaminated water directed to the heating system is taken directly from the sludge water and/or bilge water tank without any preceding purification.

2. The method of claim 1, wherein the oil sludge is withdrawn from the evaporation chamber from a bottom of the evaporation chamber.

3. The method of claim 1, further comprising circulating liquid phase from the bottom of the evaporation chamber to the heating system via a circulation pump for concentration of oil in the liquid into oil sludge.

4. The method of claim 1, further comprising supplying water from at least one engine of the ship to the heating system to cause heat exchange between the supplied water and the oil-contaminated water.

5. The method of claim 1, further comprising passing the water condensate through an activated carbon filter before measuring the level of oil-contamination in the water condensate as compared to the upper limit.

6. The method of claim 1, further comprising separating low density oil from the water condensate.

7. The method of claim 1, further comprising discharging water condensate that does not have a measured level of oil-contamination exceeding the upper limit.

8. The method of claim 1, wherein the step of re-circulating water condensate having a measured level of oil-contamination exceeding the upper limit to the heating system to be heated comprises directing the water condensate to the bilge/sludge tank.

9. The method of claim 1, further comprising:
    directing the water condensate after the level of oil contamination has been measured to a three-way valve; and
    discharging water condensate that does not have a measured level of oil-contamination exceeding the upper limit through the three-way valve,
    the step of re-circulating water condensate having a measured level of oil-contamination exceeding the upper limit to the heating system to be heated comprising directing the water condensate to the bilge/sludge tank through the three-way valve.

10. A plant for purifying oil-contaminated water generated on a ship when the ship is in motion and stored in a bilge/sludge tank, comprising:
    a heat exchanger for heating oil-contaminated water, the heat exchanger being configured to receive oil-contaminated water from the bilge/sludge tank;
    an evaporation chamber external to the heat exchanger;
    at least one nozzle coupled to the heat exchanger and arranged in the evaporation chamber, the at least one nozzle being configured to inject oil-contaminated water heated in the heat exchanger into the evaporation chamber;
    a circulation pump for circulating liquid from a bottom of the evaporation chamber back to the heat exchanger, the circulation pump also being configured to direct oil sludge withdrawn from the evaporation chamber out from the circulation/process;

a vacuum device for producing a sub-atmospheric pressure in the evaporation chamber;

a condenser for condensing water vapor obtained in the evaporation chamber to obtain water condensate;

a condensate tank for holding water condensate obtained in the condenser;

a demister arranged in the evaporation chamber above the at least one nozzle;

an oil gauge for measuring a level of oil-contamination in the water condensate from the condenser;

a water condensate recirculating device which recirculates water condensate having a concentration of oil above a maximum upper limit to the heat exchanger; and a flow control device operatively coupled after the oil gauge in a direction of flow of the water condensate, said flow control device being configured to direct water condensate having a level of an oil contamination less than or equal to the maximum upper limit to a separate tank;

wherein the oil-contaminated water fed to the process is taken directly from the sludge water and/or bilge water tank without any preceding purification.

11. The plant of claim 10, wherein the evaporation chamber has a substantially conical bottom.

12. The plant of claim 10, further comprising an activated carbon filter through which the water condensate passes between the condenser and the oil gauge.

13. The plant of claim 10, wherein the condenser is configured to separate low density oil from the water condensate.

14. The plant of claim 10, wherein the evaporation chamber is configured with a device which eliminates splashing or washing of liquid phase in the evaporation chamber.

15. The plant of claim 10, further comprising:
a conduit leading from the heat exchanger to the evaporation chamber; and
a restrictor valve for restricting flow of heated oil-contaminated water exiting the heat exchanger and being fed to the at least one nozzle, the restrictor valve being arranged in connection with the conduit.

16. The plant of claim 10, wherein the maximum upper limit is 15 ppm.

17. The plant of claim 10, wherein the heat exchanger is configured to exchange heat with heat generated by an engine of the ship.

* * * * *